(12) United States Patent
Iwashita

(10) Patent No.: US 7,400,126 B2
(45) Date of Patent: Jul. 15, 2008

(54) DC REGULATED POWER SUPPLY HAVING VOLTAGE CORRECTION

(75) Inventor: Yasuhiro Iwashita, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 103 days.

(21) Appl. No.: 10/885,011

(22) Filed: Jul. 7, 2004

(65) Prior Publication Data

US 2005/0018457 A1    Jan. 27, 2005

(30) Foreign Application Priority Data

Jul. 22, 2003    (JP)    ............................ 2003-199748

(51) Int. Cl.
G05F 1/00    (2006.01)
H02J 1/02    (2006.01)
H02M 3/335    (2006.01)

(52) U.S. Cl. .................... 323/286; 307/103; 363/39; 363/21.17

(58) Field of Classification Search ................ 322/21; 320/143; 323/51, 56.03, 50, 79, 56.04, 286; 363/51, 56.03, 50, 79, 56.04, 35, 21.17, 21.09, 363/39; 307/103, 131, 130

See application file for complete search history.

(56) References Cited

U.S. PATENT DOCUMENTS

| | | | | |
|---|---|---|---|---|
| 3,723,854 A | * | 3/1973 | Kita | ............................ 323/246 |
| 4,146,832 A | | 3/1979 | McConnell et al. | |
| 4,888,821 A | * | 12/1989 | Hamp et al. | ............. 363/21.02 |
| 5,075,617 A | * | 12/1991 | Farr | ............................ 323/258 |
| 5,182,510 A | * | 1/1993 | Nakamura | ................ 322/21 |
| 5,555,165 A | * | 9/1996 | Vinciarelli | ................ 363/95 |
| 5,861,733 A | * | 1/1999 | Yoshikawa | ................ 320/143 |
| 6,009,000 A | * | 12/1999 | Siri | ........................ 363/21.09 |
| 6,239,993 B1 | * | 5/2001 | Fraidlin et al. | ........... 363/56.03 |
| 6,628,014 B2 | * | 9/2003 | Borup | ........................ 307/103 |
| 6,788,554 B2 | * | 9/2004 | Havanur | .................. 362/21.06 |
| 6,961,255 B2 | * | 11/2005 | Nagai et al. | ................... 363/97 |

FOREIGN PATENT DOCUMENTS

| | | |
|---|---|---|
| JP | 03-245765 A | 11/1991 |
| JP | 4-261358 A | 9/1992 |
| JP | 08-263151 A | 10/1996 |

(Continued)

Primary Examiner—Jeffrey L. Sterrett
Assistant Examiner—Harry Behm
(74) Attorney, Agent, or Firm—Birch, Stewart, Kolasch & Birch, LLP

(57) ABSTRACT

In a DC regulated power supply realized as AC adapter or the like by a switching power supply, a reference voltage correction circuit, which estimates a voltage drop corresponding to a load current, corrects to increase an output voltage by changing a feedback reference value for regulation of the output voltage from a reference voltage source, in accordance with the load current sensed by the load current sensing circuit. Therefore, there occurs no negative effects that would be caused when output sensing wires are routed to a remote load. In addition, unlike the arrangement in which a reference-use rectifying circuit as well as a load-use rectifying circuit are provided, the arrangement of the switching power supply is not complicated. That is, in correcting a voltage drop, which occurs in power supply lines, corresponding to the load current, it is possible to easily perform a stable output voltage control unaffected by wire routing.

2 Claims, 4 Drawing Sheets

FOREIGN PATENT DOCUMENTS

| | | |
|---|---|---|
| JP | 10-097328 A | 4/1998 |
| JP | 10-248253 A | 9/1998 |
| JP | 10-257764 A | 9/1998 |
| JP | 10-323038 A | 12/1998 |
| JP | 11-069789 A | 3/1999 |
| JP | 2001-025238 A | 1/2001 |
| JP | 2003-189600 A | 7/2003 |

* cited by examiner

SECTION A-A'

DC REGULATED POWER SUPPLY HAVING VOLTAGE CORRECTION

This Nonprovisional application claims priority under 35 U.S.C. § 119(a) on Patent Application No. 2003/199748 filed in Japan on Jul. 22, 2003, the entire contents of device are hereby incorporated by reference.

FIELD OF THE INVENTION

The present invention relates to a DC regulated power supply suitably used as an AC (alternating-current) adapter that supplies a DC supply voltage to a load-side device via power supply lines.

BACKGROUND OF THE INVENTION

FIG. 4 is a block diagram of an electrical arrangement of a typical and conventional DC regulated power supply 1 used as the AC adapter. In the DC regulated power supply 1 that is a so-called switching power supply, an AC input voltage from a utility commercial power source 2 is first transformed to a DC voltage by a rectifier diode 3 and a smoothing capacitor 4. The AC input voltage from the utility power source 2 becomes the DC voltage of the smoothing capacitor 4. That is, both ends of the smoothing capacitor 4 become a DC power supply. Across the DC power supply (between the both ends of the smoothing capacitor 4) connected is a series circuit of a primary winding 5a of a transformer 5 and a switching element 6, and the switching element 6 is intermittently controlled by a pulse from a control circuit 7. This arrangement induces a voltage in a secondary winding 5b of the transformer 5. The induced voltage is rectified and smoothed by a diode 8 and a smoothing capacitor 9 and then supplied to a load 11 via the power supply lines 10.

Here, for a switching power supply of which a high degree of output voltage accuracy is demanded, the switching power supply (AC adapter) has. an output voltage sensor circuit 12 provided therein, and a voltage at the load end is practically received by the output voltage sensor circuit 12 via output sensing wires 13. Then, a comparator circuit 14 compares a sensing result of the output voltage sensor circuit 12 to a reference voltage from a reference voltage source 15. A comparison result of the comparator circuit 14 is transferred to the control circuit 7 via a photocoupler (not shown), for example, provided for the purpose of electrical isolation. The control circuit 7 changes the pulse duty factor of the switching element 6 depending on output voltage level. With this arrangement, the voltage at the load end is controlled to be a desired voltage.

Further, the output voltage sensor circuit 12 senses an actual voltage at the load end via the output sensing wires 13, not via output end of the AC adapter, thereby realizing a stable output voltage control unaffected by wiring lengths and wire routing of the power supply lines 10, with consideration given to a voltage drop caused by the wiring lengths and wire routing of the power supply lines 10.

However, in the foregoing conventional switching power supply, since the output sensing wires 13 extend closely to the load end, increase in the lengths of the power supply lines 10 results in an unstable control caused by noise and others. Further, in practical usage conditions, a further unstable control might occur since the inductance of cables (output sensing wires 13) changes, for example, for the reason that the output sensing wires 13 are tied together into a ring-like form.

Another conventional switching power supply that can solve such a problem has been proposed in Japanese Laid-Open Patent Application No. 1992/261358 (Tokukaihei 4-261358; published on Sep. 17, 1992). In that conventional switching power supply, a voltage drop occurring in a cable (power supply lines) is corrected, without the aforementioned remote sensing using the output sensing wires 13. Specifically, on the secondary side of the switching power supply, in addition to a load-use direct current transforming section, an auxiliary direct current transforming section is provided. Further, in the conventional switching power supply, the voltage drop occurring in the cable (power supply lines) is corrected by capitalizing on the effects that no load current flows and no voltage drop occurs in the auxiliary direct current transforming section. More specifically, a difference between an output voltage to a load and a DC voltage of the auxiliary direct current transforming section is amplified, and the amplified amount is added to a reference voltage for feedback control, thereby correcting the voltage drop occurring in the cable (power supply lines).

The foregoing conventional switching power supply requires two direct current transforming sections, causing a complicated configuration.

SUMMARY OF THE INVENTION

The present invention provides a DC regulated power supply which can easily perform a stable output voltage control unaffected by routing of output sensing wires.

A DC regulated power supply of the present invention is a DC regulated power supply which supplies a DC voltage regulated to a desired voltage to a load through power supply lines, the DC regulated power supply comprising: a sensing section which senses a load current; and a correcting section which, in response to a sensing result of the sensing section, performs correction to increase an output voltage with respect to a predetermined voltage drop, which occurs in the power supply lines, corresponding to the load current.

In a conventional DC regulated power supply realized, as AC adapter or the like, by a switching power supply, when a DC voltage regulated to a desired voltage is supplied to a load-side device through power supply lines, a voltage drop corresponding to a load current occurs in the power supply lines. In correcting to increase a voltage corresponding to the amount of voltage drop, when output sensing wires from an output voltage sensing section are routed to a remote load, negative effect is caused by the routing of the output sensing wires. However, in the present invention, the correcting section, which estimates a voltage drop corresponding to the load current, performs the above-mentioned correction to increase the output voltage, for example, by changing a feedback reference value for regulation of the output voltage in accordance with the load current sensed by the sensing section.

Therefore, it is possible to easily perform a stable output voltage control unaffected by routing of the output sensing wires.

For a fuller understanding of the nature and advantages of the invention, reference should be made to the ensuing detailed description taken in conjunction with the accompanying drawings.

DESCRIPTION OF THE EMBODIMENTS

First Embodiment

Figure 1:
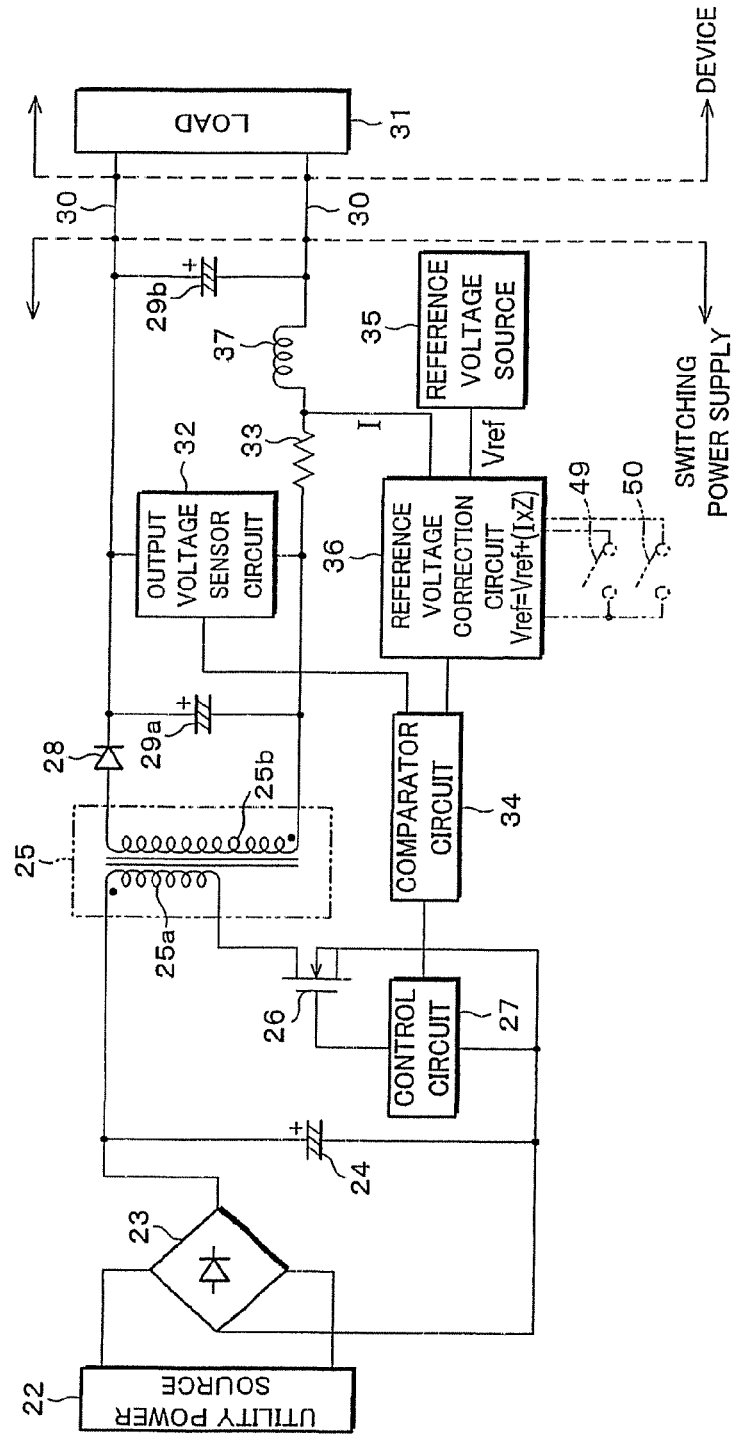
FIG. 1 is a block diagram illustrating an electrical arrangement of a DC regulated power supply of one embodiment of the present invention.

The following will describe one embodiment of the present invention with reference to FIG. 1. Note that the present embodiment does not limit the scope of the present invention and is merely one example.

Figure 4:
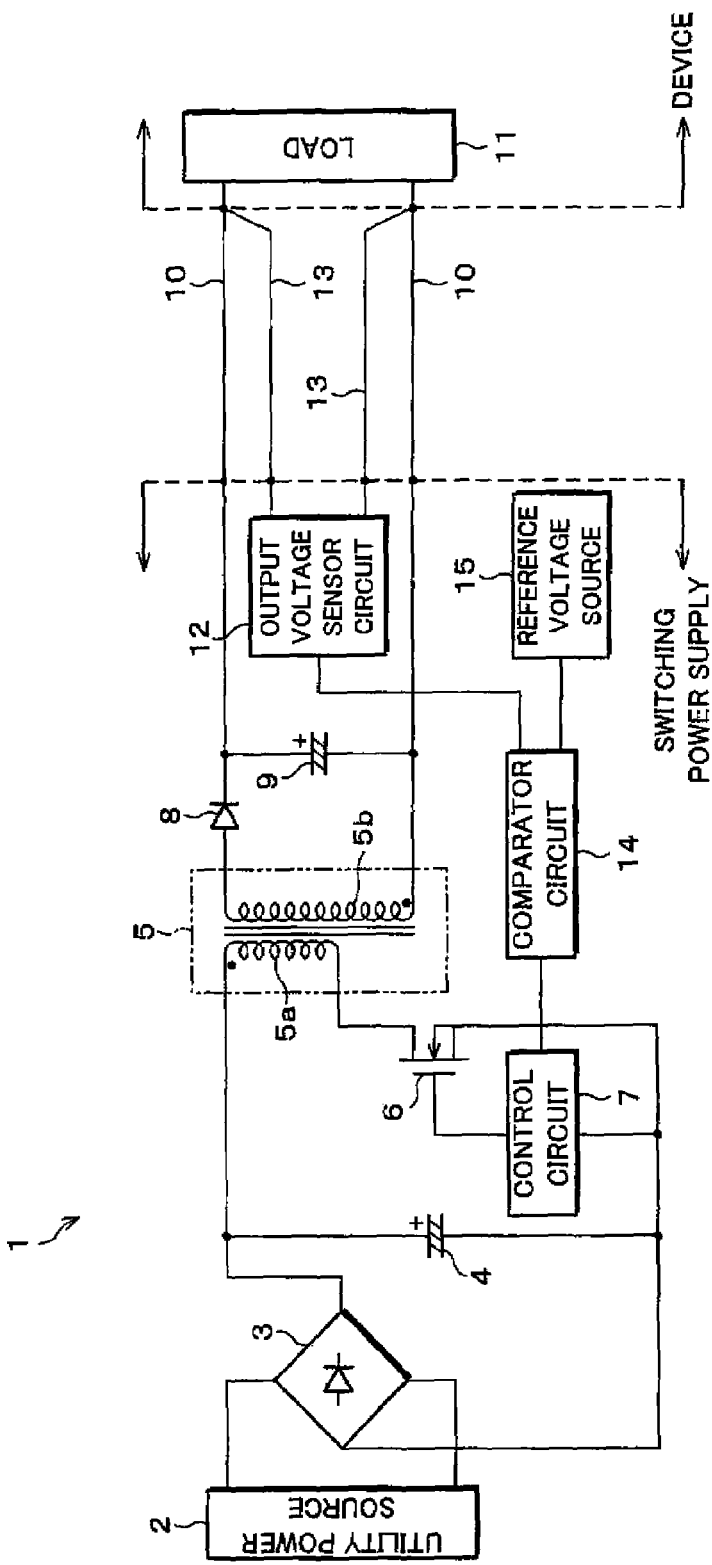
FIG. 4 is a block diagram illustrating an electrical arrangement of a conventional DC regulated power supply as an AC adapter.

FIG. 1 is a block diagram illustrating an electrical arrangement of a DC regulated power supply 21 of one embodiment of the present invention. In the DC regulated power supply 21 that is a switching power supply used as the AC adapter, an AC input voltage from a utility power source 22 is transformed to a DC voltage by a rectifier diode 23 and a smoothing capacitor 24. The AC input voltage from the utility power source 22 becomes the DC voltage of the smoothing capacitor 24. That is, both ends of the smoothing capacitor 24 become a DC power supply. Across the DC power supply (between the both ends of the smoothing capacitor 24) connected is a series circuit of a primary winding 25a of a transformer 25 and a switching element 26, and the switching element 26 is intermittently controlled by a pulse signal from a control circuit 27. This arrangement induces a voltage in a secondary winding 25b of the transformer 25. The induced voltage is rectified and smoothed by a diode 28 and smoothing capacitors 29a and 29b and then supplied to a load 31 through power supply lines 30. The above-mentioned arrangement of the DC regulated power supply 21 is the same as that of the DC regulated power supply 1 illustrated in FIG. 4.

This DC regulated power supply 21 has an output voltage sensor circuit 32 provided therein. The output voltage sensor circuit 32 senses an output voltage, and a voltage at the load end is controlled based on a sensing result of the output voltage sensor circuit 32 so as to be a desired voltage. First, as in the DC regulated power supply 1, a comparator circuit 34 compares the sensing result of the output voltage sensor circuit 32 to a reference voltage from a reference voltage source 35. Then, a comparison result of the comparator circuit 34 is transferred to the control circuit 27 via a photocoupler (not shown), for example, provided for the purpose of electrical isolation. The control circuit 27 changes the pulse duty factor of the switching element 26 depending on output voltage level (depending on the transferred comparison result). With this arrangement, the voltage at the load end is controlled to be a desired voltage (a voltage being equal to the reference voltage).

Note that, this DC regulated power supply 21 has a load current sensor circuit 33 for sensing a load current (a current value of a direct current flowing in the load 31), provided therein. The load current sensor circuit 33 senses an actual current at the load end, and the output voltage is corrected in accordance with a sensing result of the load current sensor circuit 33. In the present invention, a reference voltage correction circuit 36 is provided in association with the output voltage sensor circuit 32. The reference voltage correction circuit 36 adds a correction voltage derived from the sensing result of the load current detector circuit 33 to the reference voltage from the reference voltage source 35 and outputs the resulting voltage to the comparator circuit 34. The correction voltage is a voltage substantially equal to the amount of voltage drop caused by impedance of the power supply lines 30 extending from the DC regulated power supply 21 to the load 31. The correction voltage is predetermined in accordance with the load current. For example, assuming that the impedance of the power supply lines 30 extending from the DC regulated power supply 21 to the load 31 is 0.1Ω, a correction voltage value for 1A is set as 0.1Ω×1A=0.1V. More specifically, for example, when the load current sensed by the load current sensor circuit 33 (a value of a direct current flowing in the load 31) is denoted as I, and the impedance of the power supply lines 30 connecting between the DC regulated power supply 21 to the load 31 is denoted as Z, the correction voltage value is set so as to be equal to I×Z.

Thus, the predetermined correction voltage corresponding to the load current sensed by the load current sensor circuit 33 is added to the reference voltage, thereby increasing the reference voltage by a voltage substantially equal to the amount of voltage drop caused by the impedance of the power supply lines 30. Therefore, performed is correction to increase the output voltage by a voltage substantially equal to the amount of voltage drop caused by the impedance of the power supply lines 30. Accordingly, the voltage drop caused by the impedance of the power supply lines 30 is cancelled by the correction of the output voltage. This makes it possible to perform a stable output voltage control, with a simple arrangement, unaffected by wire routing in a circuitry like the one including the output sensing wires 13. Also, it is possible to perform a constant voltage control at the load end.

Still further, in the DC regulated power supply 21, the output voltage on the secondary is smoothed by the two smoothing capacitors 29a and 29b. That is, a secondary circuit includes the smoothing capacitor 29a (first smoothing circuit) for smoothing output of the transformer 25 and the smoothing capacitor 29b (second smoothing circuit) for smoothing output of the smoothing capacitor 29a. The load current sensor circuit 33 is realized by a current sensing resistor that is inserted in series with the power supply lines for the secondary, and provided between the two smoothing capacitors 29a and 29b.

The capacitances of these two smoothing capacitors 29a and 29b are set to the capacitances by which not only an output ripple (AC voltage components contained in the output voltage) is suppressed, but also after smoothing operation in the smoothing capacitor 29a at the front stage, the smoothing capacitor 29b at the rear stage prevents an excessive response with respect to a steeply changed load current, so as to perform a stable control.

Further, a coil 37 is connected in series with the load current sensor circuit 33 (current sensing resistor). Therefore, the coil 37 as well as the smoothing capacitor 29b can reduce the output ripple.

Yet further, in the DC regulated power supply 21, it is preferable that the control circuit 27 has overcurrent protection function of limiting output when the correction voltage becomes higher than or equal to a preset value. Specifically, an upper limit of the load current is set in the reference voltage correction circuit 36. When a load current higher than or equal to that upper limit is sensed, the control circuit 27 performs overcurrent protection operation. More specifically, it is preferable that while the control circuit 27 performs a normal operation (operation of controlling the output voltage so that a voltage supplied to the load becomes a desired voltage) when the correction voltage is lower than the preset value, the control circuit 27 performs the overcurrent protection operation (operation of decreasing output voltage to zero volts, for example, so that no overcurrent occurs) when the correction voltage is higher than or equal to the preset value.

Further, the overcurrent protection operation is realized by ceasing switching output on the primary (conduction of the primary winding 25a of the transformer 25, i.e. intermittent conduction of the switching element 26), and has latching function of canceling the overcurrent protection operation when power is turned on again. Specifically, the overcurrent protection operation continues during power-up. When the AC adapter is removed from an outlet, and the AC adapter is inserted into the outlet to turn power on again, the switching output is resumed. Such an arrangement prevents the possibility that undesired cancellation of the overcurrent protection might be caused by the operation on the secondary during power-up.

Second Embodiment

Figure 2:
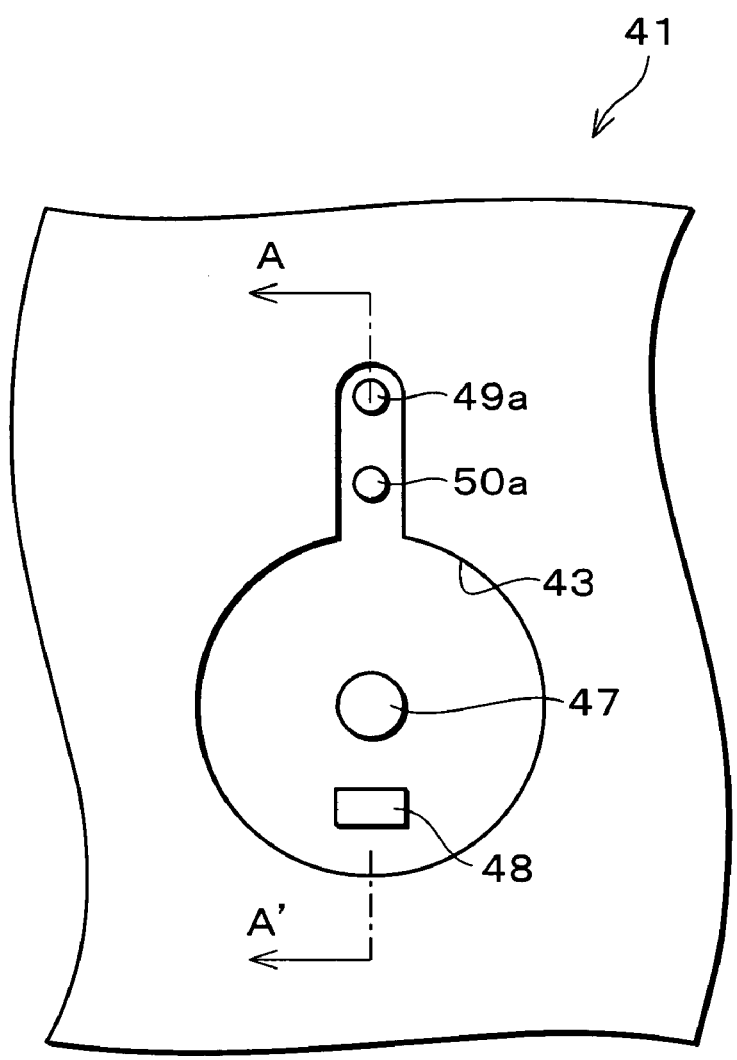
FIG. 2 is a front view of a connector in a DC regulated power supply of another embodiment of the present invention.
Figure 3:
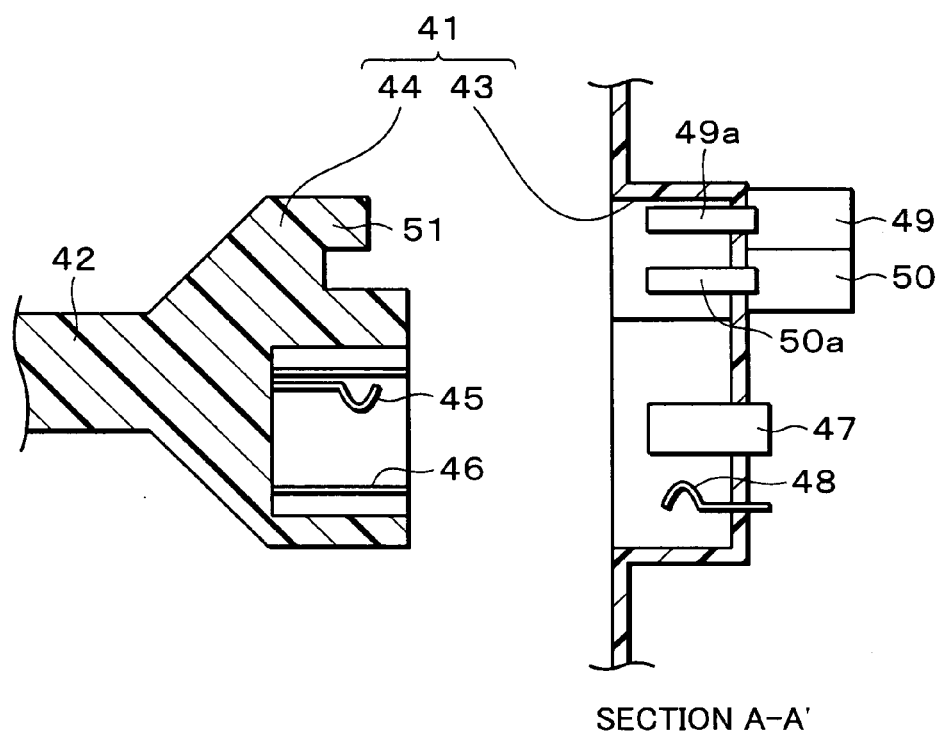
FIG. 3 is a cross-sectional diagram of the connector.

The following will describe another embodiment of the present invention with reference to FIGS. 2 and 3, and the above-mentioned FIG. 1.

FIG. 2 is a front view of a connector 41 in a DC regulated power supply of another embodiment of the present invention, and FIG. 3 is a cross-sectional view taken on line A-A' of FIG. 2 and a cross-sectional view of the corresponding part of a power supply cable 42.

Note that, in the present embodiment, in the DC regulated power supply used as the AC adapter described before, the power supply cable 42 is interchangeable. With this arrangement, the AC adapter has a jack 43 attached thereto, and the power supply cable 42 has a plug 44 attached to its end. The jack 43 is the one for interchangeably connecting a plurality of plugs 44 of the power supply cables 42 mutually different in impedance. The plug 44 of the power supply cable 42 has a shape varying depending on the type of the power supply lines 30. More specifically, the plug 44 of one type of the power supply cable 42 has an identification piece 51 corresponding to an activation piece 49, as illustrated in FIG. 3. On the other hand, the plug 44 of the other type of the power supply cable 42 has other identification piece 51, not shown, corresponding to an activation piece 50a. When the plug 44 is inserted into the jack 43, terminals 45 and 46 of the plug 44 are electrically connected to corresponding terminals 47 and 48 of the jack 43. This arrangement enables power supply from the DC regulated power supply to the load 31.

Further, in the connector 41, the jack 43 is provided with switches 49 and 50 (setting value changing means). When the plug 44 is inserted into the jack 43, either of the activation pieces 49a and 50a is pressed by the identification piece 51 (corresponding to the activation piece 49a in FIG. 3) of the plug 44, and either of the switches 49 and 50 is turned on.

Meanwhile, for application to this DC regulated power supply, the switches 49 and 50, as represented by virtual lines illustrated in FIG. 1, are provided in association with the reference voltage correction circuit 36. A reference voltage from the reference voltage source 35 is selected in accordance with changeover between the switches 49 and 50. Specifically, two reference voltages, outputted from the reference voltage source 35, may be selected alternately therebetween by the switches 49 and 50, or two reference voltages may be produced from one reference voltage by voltage division or other manner.

The identification piece 51 is provided depending on difference in impedance of the power supply cable 42. Therefore, even when the power supply cables 42 mutually different in length and current capacity are used, differences in impedance between the power supply cables 42 are distinguished from differences in shapes of their connectors, thus setting a suitable correction voltage. That is, the switches 49 and 50 identify the type of the power supply line 30 connected to the jack 43 in accordance with the shape of the plug 44 connected to the jack 43, and a setting value of the correction voltage determined depending on the load current is changed in accordance with the type of the power supply line 30 connected to the jack 43. Therefore, the AC adapter can perform a proper voltage drop correction.

As described above, a DC regulated power supply of The present invention is a DC regulated power supply which supplies a DC voltage regulated to a desired voltage to a load (especially, load-side circuit) through power supply lines, including: sensing means which senses a load current (a current value of a direct current to be supplied to the load); and correcting means which, in response to a sensing result of the sensing means, performs correction to increase an output voltage with respect to a predetermined voltage drop, which occurs in the power supply lines, corresponding to the load current.

That is, as described above, a DC regulated power supply of the present invention is a DC regulated power supply, as AC adapter or the like, realized by a switching power supply, wherein: for correction of a voltage drop corresponding to the load current, caused in the power supply lines, in supplying a DC voltage regulated to a desired voltage to a load (especially, the load-side circuit) through power supply lines, the correcting means estimates the voltage drop corresponding to the load current, and performs correction to increase the output voltage in accordance with the load current sensed by the sensing means, for example, by changing a feedback reference value for regulation of the output voltage.

In other words, a DC regulated power supply of the present invention is a DC regulated power supply (21) which supplies a DC voltage regulated to a desired voltage to a load (31) through power supply lines (30), including: sensing means which senses a current value of a direct current to be supplied to the load (31); and correcting means (36) which increases an output voltage in accordance with the current value sensed by the sensing means (33) so that the voltage drop caused in the power supply lines (30) is cancelled.

Therefore, it is possible to easily perform a stable output voltage control unaffected by wire routing.

Further, as described above, in a DC regulated power supply of the present invention, the correcting means corrects the output voltage so that the output voltage becomes a total voltage of a base output voltage and a correction voltage substantially equal to the amount of voltage drop caused by impedance from a power output end to a load end (sum of the base output voltage and the correction voltage substantially equal to the amount of voltage drop caused by impedance from the power output end to the load end).

That is, in a DC regulated power supply of the present invention, when the base output voltage (desired voltage to be supplied to the load) is V0, and the amount of voltage drop caused by impedance (impedance of the power supply lines) from the power output end (voltage output end of the DC regulated power supply) to the load end is Vd, the correcting means corrects the output voltage so that the output voltage becomes substantially equal to V0+Vd.

With this arrangement, a constant voltage control at the load end is further possible.

Still further, a DC regulated power supply of the present invention comprises a switching power supply in which a utility AC power (utility AC voltage) is rectified and smoothed to produce a first DC power (DC voltage), the first DC power is cut off intermittently by a switching element to produce a first AC power (AC voltage), the first AC power is fed to a transformer to produce a second AC power (AC voltage), the second AC power is a/d converted in a secondary circuit (circuit including a rectifying circuit and a smoothing circuit, connected to the secondary winding of the transformer) to produce a second DC power (DC voltage), and the second DC power is fed to a load, and is an AC adapter, which is provided outside of a load-side device, connected to the load-side device via the power supply lines, the power supply lines being interchangeable, the correcting means changing a setting value of the correction voltage in accordance with a type of the power supply lines (setting value of the correction voltage corresponding to the load current).

According to the above arrangement, in the AC adapter realized by the switching power supply, in the case where wiring is changed while the AC is in use, it is possible to control power supply in accordance with impedance of the wiring.

Further, as described above, in a DC regulated power supply of the present invention, interchange of the power supply lines is realized by connection between the AC adapter and the power supply line via a connector, the type of the power supply lines varies depending on impedance of wiring, and the correcting means changes a setting value of the correction voltage in accordance with a shape of the connector varying depending on the type of the power supply lines.

According to the above arrangement, the correcting means changes a setting value of the correction voltage by inserting the connector into the AC adapter in the arrangement where the power supply lines through which power is supplied from the AC adapter to the load-side device is connected/disconnected by the connector, and the shape of the connector varies depending on difference in impedance of wiring.

Therefore, when the power supply line is connected to the AC adapter, it is possible to automatically perform a setting of the correction voltage corresponding to impedance of wiring.

Still further, a DC regulated power supply of the present invention is an AC adapter realized by a switching power supply, including control means which controls switching of the switching element, the control means having a function of limiting output (decreasing the output voltage to a voltage at which no overcurrent occurs, for example, 0V) when the correction voltage becomes higher than or equal to a preset value.

Therefore, it is possible to perform overcurrent protection operation when the output current becomes higher than or equal to a preset value under abnormal load conditions or the like.

Further, as described above, in a DC regulated power supply of the present invention, the control means realizes the output limit operation by ceasing switching output on a primary, and has a latching function of resuming the switching output when power is turned on again.

According to the above arrangement, the control means realizes the overcurrent protection operation by ceasing the switching output on the primary. The overcurrent protection operation continues during power-up. When the AC adapter is removed from an outlet, and the AC adapter is inserted into the outlet to turn power on again, the switching output is resumed.

Therefore, such an arrangement prevents the possibility that undesired cancellation of the overcurrent protection might be caused by the operation on the secondary during power-up.

Still further, as described above, in a DC regulated power supply of the present invention, the secondary circuit includes two smoothing circuits, and the sensing means is arranged between the two smoothing circuits.

Not only by suppressing an output ripple in the two smoothing circuit, but also by setting a capacitance balance of the two smoothing circuits, the smoothing circuit at the rear stage can prevent an excessive response with respect to a steeply changed load current.

Further, as described above, in a DC regulated power supply of the present invention, the sensing means includes a current sensing resistor which is inserted in series with the power supply lines for a secondary (power supply lines inside the secondary circuit), and a coil is connected in series with the current sensing resistor.

Therefore, it is possible to reduce the output ripple.

The invention may be varied in many ways. Such variations are not to be regarded as a departure from the spirit and scope of the invention, and all such modifications are intended to be included within the scope of the following claims.

What is claimed is:

1. A DC regulated power supply which supplies a DC voltage regulated to a desired voltage to a load through power supply lines, the DC regulated power supply comprising:

sensing means which senses a load current;

correcting means which, in response to a sensing result of the sensing means, performs correction to increase an output voltage with respect to a predetermined voltage drop, which occurs in the power supply lines, corresponding to the load current;

a transformer;

a first smoothing circuit, connected to a secondary winding of the transformer, which smoothes output of the transformer;

a second smoothing circuit which smoothes output of the first smoothing circuit, the sensing means being provided between an output of the first smoothing circuit and an input of the second smoothing circuit, and the sensing means includes a current sensing resistor which is inserted in series with the power supply lines for a secondary side; and a coil connected in series with the current sensing resistor that provides additional smoothing to the smoothing performed by the second smoothing circuit, the coil and the second smoothing circuit being provided at a rear stage of the current sensing resistor, wherein:

the correcting means corrects the output voltage so that the output voltage becomes a total voltage of a base output voltage and a correction voltage, the base output voltage being a desired voltage to be supplied to the load, the correction voltage being equal to a product of impedance of the power supply lines and the load current sensed by the sensing means, the correcting means supplying the corrected output voltage, as the DC voltage regulated to a desired voltage, to the load through the power supply lines, the DC regulated power supply further comprising:

control means which controls the output voltage so that a voltage supplied to the load becomes a desired voltage when a correction voltage is lower than a preset value, and, on the other hand, decreases the output voltage in such a manner that no over current occurs when the correction voltage is higher than or equal to the preset value.

2. A DC regulated power supply which supplies a DC voltage regulated to a desired voltage to a load through power supply lines, the DC regulated power supply comprising:

a sensing section which senses a load current;

a correcting section, having an input for receiving the load current from the sensing section, performing correction to increase an output voltage with respect to a predetermined voltage drop, which occurs in the power supply lines, corresponding to the load current;

a first smoothing circuit which smoothes AC voltage components supplied from a power source;

a second smoothing circuit which smoothes output of the first smoothing circuit, the second smoothing circuit including a coil and a smoothing capacitor;

the sensing section being provided between an output of the first smoothing circuit and an input of the second smoothing circuit; and control means which controls the output voltage so that a voltage supplied to the load becomes a desired voltage when a correction voltage is lower than a preset value, and, on the other hand, decreases the output voltage in such a manner that no over current occurs when the correction voltage is higher than or equal to the preset value.

* * * * *